Patented June 3, 1930

1,761,475

UNITED STATES PATENT OFFICE

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE

SIDE CHAIN CHLORINATION PRODUCTS OF META NITROTOLUENE AND PROCESS OF MAKING THE SAME

No Drawing.  Application filed December 8, 1926. Serial No. 153,467.

This invention relates to the preparation of side chain chlorination products of meta nitro toluene and more particularly to meta nitro benzyl chloride and meta nitro benzal chloride.

According to the literature, it has been considered impossible under any known conditions to chlorinate meta nitro toluene. (See "Annalen der Chemie und Pharmacie", vol. 185 at pages 280, 1877). Heretofore known methods for producing the side chain chlorination products of meta nitro toluene have used as their starting material, meta nitro benzaldehyde, which is an expensive raw material.

We have discovered, however, that meta nitro toluene can be chlorinated in the side chain under certain conditions. Whereas the chlorination reaction proceeds slowly, if at all, without the use of a catalyst, we have found that by the use of certain catalysts the reaction may be satisfactorily carried out. We prefer to use as catalyst a source of ultra-violet or actinic light such as sunlight, or as nearly as possible its equivalent produced artificially, as by an incandescent lamp, arc lamp or the like. Depending upon the amount of chlorine used, we are able to a large extent to control the relative proportions of benzyl and benzal chlorides obtained as final products. The reactions are expressed by the following chemical equations:

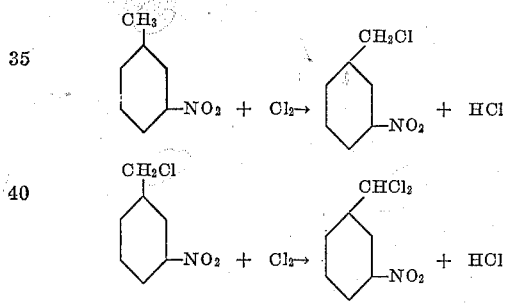

We have discovered also that other catalysts serve as aids in accelerating the speed of the reaction, such as phosphorous pentachloride, iodine and the like. But in general we prefer to work without the addition of such catalysts on account of the fact that at the high temperatures employed for carrying out the reaction there is a tendency when these catalysts are used to produce some tarry by-products.

Without limiting our invention to any particular procedure, the following example in which parts by weight are given, illustrates the application of our invention in the preferred form.

1370 parts of meta nitro toluene are placed in a flask having an air condenser above. Close to the flask there is placed a 200 watt incandescent lamp. The temperature in the flask is now raised to 130–140° C. at which temperature a stream of dry chlorine is passed into the meta nitro toluene. As soon as the weight increase is equal to the theoretical increase necessary to form meta nitro benzal chloride, the reaction is stopped. The time involved for the reaction is a variable which will depend upon the size of the apparatus, and the intensity of the light used and other factors. About 240 hours are required for the maximum production of meta nitro benzal chloride with the apparatus described. In practice, the actual end point for a maximum yield of meta nitro benzal chloride is determined by determination of the crystalizing point on a sample. At the start, the crystallizing point is about 15° C., but as chlorination proceeds, the crystallizing point will fall and then rise to about 25° C. This is about the point at which a maximum quantity of meta nitro benzyl chloride will have been produced. Upon further chlorination, the crystallizing point will again fall and then rise again. When the crystallizing point reaches 33 to 34° C., approximately a maximum yield of meta nitro benzal chloride will have been produced. The meta nitro benzal chloride is isolated by crystallization. The yield obtained is satisfactory. The melting point of the purified meta nitro benzal chloride is 65° C.

It is to be understood that instead of adding the above amount of chlorine to the reaction mass, a lesser amount can be used to obtain meta nitro benzyl chloride. Approximately 100 hours are necessary to obtain the maximum yield of meta nitro benzyl chloride, according to the conditions of the above example. It is also further understood that instead of chlorine, another halogen, bromine, can be employed thus giving as end product either meta nitro benzyl bromide or meta nitro benzal bromide.

We are aware that numerous other details of the process may be varied through a wide range without departing from the spirit of this invention and we do not desire limiting the patent granted hereon other than as necessitated by the prior art.

We claim as our invention:

1. A process of preparing side chain chlorination products of meta nitro toluene, which comprises treating meta nitro toluene with chlorine in the presence of a chlorination catalyst at above ordinary room temperatures.

2. A process of preparing meta nitro benzal chloride which comprises treating meta nitro toluene at above ordinary room temperatures with chlorine in the presence of a chlorination catalyst until substantially a maximum quantity of meta nitro benzal chloride has been produced.

3. A process of preparing side chain chlorination products of meta nitro toluene, which comprises passing chlorine gas into meta nitro toluene at an elevated temperature while exposing the meta nitro toluene to ultra violet light.

4. A process of preparing meta nitro benzal chloride, which comprises passing dry chlorine gas into meta nitro toluene maintained at a temperature of approximately 130 to 140° C., simultaneously subjecting the meta nitro toluene to the effect of ultra violet light and continuing the passing of chlorine gas until a maximum quantity of meta nitro benzal chloride has been produced.

In testimony whereof we have hereunto subscribed our names.

IVAN GUBELMANN.
HENRY J. WEILAND.
OTTO STALLMANN.